United States Patent [19]

Dreyer, Jr.

[11] Patent Number: 4,634,246

[45] Date of Patent: Jan. 6, 1987

[54] AUTOMATIC FOCUS FOR OVERHEAD PROJECTOR

[75] Inventor: John F. Dreyer, Jr., North Oaks

[73] Assignee: Minnesota Mining and Manufacturing Company, St. Paul, Minn.

[21] Appl. No.: 718,214

[22] Filed: Apr. 1, 1985

[51] Int. Cl.⁴ ............................................. G03B 21/30
[52] U.S. Cl. ................................ 353/98; 353/DIG. 6
[58] Field of Search ................... 353/DIG. 6, DIG. 3, 353/DIG. 4, DIG. 5, 69, 70

[56] References Cited

U.S. PATENT DOCUMENTS 3,472,589 10/1969 Field .......................... 353/DIG. 6 X
3,486,817 12/1969 Hubner ...................... 353/DIG. 4 X

FOREIGN PATENT DOCUMENTS 3136970 9/1984 Fed. Rep. of Germany .
990930 5/1965 United Kingdom ......... 353/DIG. 3

Primary Examiner—Harry N. Haroian
Attorney, Agent, or Firm—Donald M. Sell; James A. Smith; David W. Anderson

[57] ABSTRACT

An overhead projector includes a projection head which contains a pivoting mirror and a pivoting projection lens interconnected by a linkage. Rotation of the mirror causes rotation and translation of the projection lens and automatically corrects for Scheimpflug distortion and loss of overall focus of the projected image.

2 Claims, 3 Drawing Figures

AUTOMATIC FOCUS FOR OVERHEAD PROJECTOR

BACKGROUND OF THE INVENTION

1. Field of the Invention

The present invention relates to overhead projectors.

2. Description of the Prior Art

Conventional overhead projectors of the transmissive type include a projector body having a condensing lens system defining an object stage and a light source located below the stage and within the body of the projector. A projection lens and mirror are supported above the stage by a projection head, with the projection lens interposed between the mirror and the stage. A slide or transparency is placed upon the stage and light from the light source is directed through the transparency and condensed to the projection lens. After exiting the projection lens, the light is reflected by the mirror to an imaging surface, usually a wall or a screen, to produce a magnified image of the transparency. The overhead projector is most useful for projecting magnified images of A-4 sized originals for group viewing.

The projection lens is usually parallel to the stage and overall focus of the image may be adjusted by varying the back focus of the projection lens, back focus being the distance of the projection lens from the object. If the mirror is oriented at 45 degrees, so that the reflected plane of the image is parallel to the plane of the projection lens and the plane of the object, the image will be uniformly in focus and undistorted because the Scheimpflug condition is met. The Scheimpflug condition dictates that the extended planes of the reflected image, projection lens and object must meet at a point or infinity for the image to be uniformly in focus.

It is sometimes necessary, however, for the mirror to be tilted to an angle above 45 degrees, relative to the plane of the object, in order to raise the image for greater viewing ease. In this situation, the Scheimpflug condition is no longer met since the reflected plane of the image is not parallel to the planes of the projection lens and the object, and the image is not uniformly in focus (Scheimpflug distortion). Also, the overall focus of the image is incorrect because the distance from the projection lens to the image (front focus) has increased. To correct the Scheimpflug distortion, it is necessary to tilt the projection lens in the direction of increased mirror tilt, and to correct the overall focus it is necessary to adjust the distance between the projection lens and the object (back focus) by translating the projection lens toward the object.

West German Offenlegungsschriften No. 3,136,970 addresses the problem of Scheimpflug distortion introduced when the image is raised by increased tilt of the reflecting mirror. The West German document discloses a projection head which includes a projection lens pivoted at its optic axis and a linkage connecting the mirror and the projection lens. As the mirror is rotated relative to the housing to change the location of the image, the linkage causes the projection lens to rotate in a direction corresponding to the rotation of the mirror. This coordinated movement of the mirror and the projection lens will correct for Scheimpflug distortion, assuming that the ratio of rotation between the projection lens and the mirror is appropriate, but will do nothing to correct for the loss of overall focus due to the increased front focus distance from the projection lens to the image. To obtain uniform focus, the entire projection head, including the mirror and the projection lens, will have to be adjusted to obtain the correct distance between the projection lens and the object.

SUMMARY OF THE INVENTION

The present invention simultaneously corrects for both Scheimpflug distortion and overall focus as the angle of the mirror of an overhead projector is adjusted by providing a projection head pivotally mounting the mirror for rotation with respect to the plane of the object, a frame mounting the projection lens and connected at a pivot to the projection head, the pivot being removed from the optic axis of the projection lens so that rotation of the framework about the pivot results in rotation and translation of the projection lens, and a linkage connecting the mirror and the projection lens frame so that pivoting of the mirror results in rotation of the frame about its pivot and rotation and translation of the projection lens with respect to the plane of the object.

Therefore, according to the invention, rotation of the mirror results in rotation of the projection lens and correction for Scheimpflug distortion and also results in translation of the projection lens relative to the object to adjust the back focus of the projection lens and correct the overall focus of the image.

Preferably, the projection head is also provided with means for disconnecting the linkage between the mirror and the projection lens so that separate adjustment of the mirror and lens is available if desired or necessary.

BRIEF DESCRIPTION OF THE DRAWING

The present invention will be more thoroughly described with reference to the accompanying drawing, wherein like numbers refer to like parts in the several views, and wherein.

DESCRIPTION OF THE PREFERRED EMBODIMENTS

Figure 1:
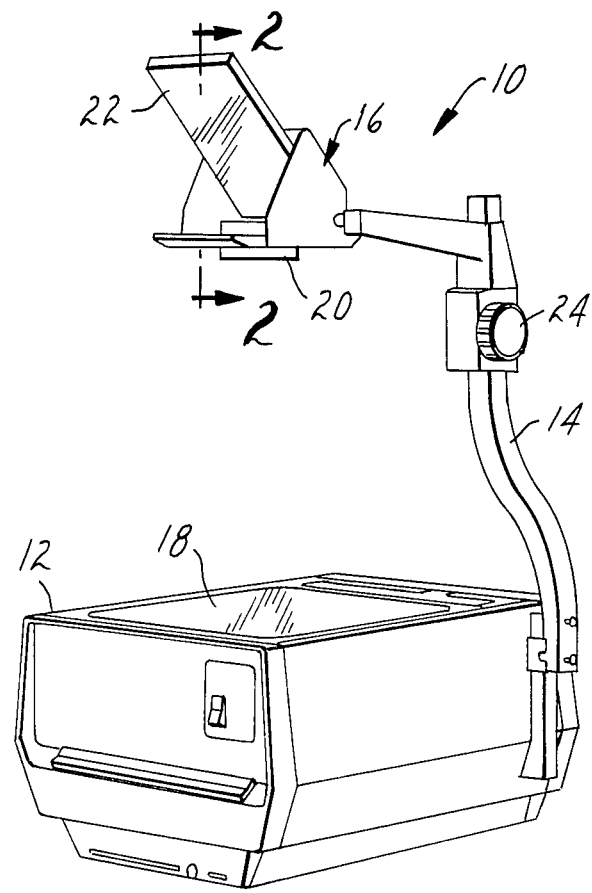
FIG. 1 is a perspective view of an overhead projector and a projection head according to the present invention.

FIG. 1 is a perspective view of an overhead projector, generally indicated as 10, which includes a rectangular base 12, an upright support 14 and a projection head generally indicated as 16. Defining an object stage on the upper surface of the rectangular base 12 is a condensing lens 18 which supports an object, usually a transparent or translucent slide or "transparency", the image of which is to be projected. The overhead projector 10 illustrated in FIG. 1 is of the transmissive type in that light is directed through the object by a light source (not shown) located within the base 12 rather than from a light source located at the projection head 16 as in reflective type projectors. Although the present invention is equally applicable to either type of overhead projector, reference will be made only to the transmissive type for simplicity.

Light exiting the condensing lens or object plane 18 is refracted in a cone through the object and to a projection lens 20 which is supported by the projection head 16. The projection lens 20 is usually and preferably of the triplet type well known in the art. Light exiting the projection lens 20 is reflected by a planar mirror 22 to an image plane where the object may be viewed. The image plane is usually a vertical wall or screen, but may be a tilted screen.

In the case of a vertical image plane, the projected image will be uniformly in focus if the object plane 18 is horizontal, the projection lens 20 is parallel to the object plane 18 and the mirror 22 is tilted at an angle of 45 degrees. The image will be uniformly in focus in this instance because the optical system described satisfies the Scheimpflug condition, which dictates that focus uniformity throughout the image will be achieved if the extended planes of the reflected image, the object and the projection lens meet at a point or are parallel and thus meet at infinity. The overall focus of the projected image is determined by the distances from the object plane 18 to the projection lens 20 and from the projection lens 20 to the image plane. These distances may be adjusted, and the image brought into overall focus, by adjusting the position of the projection lens 20 relative to the object plane 18 by means of an adjusting knob 24 which varies the height of the projection head 16, and the projection lens 20, above the object plane 18. Thus if the image plane is vertical, the image produced by the overhead projector 10 may be brought into focus simply by adjusting the height of the projection head 16 relative to the object plane 18 by means of the adjusting knob 24.

It is very often the case, however, that an image projected with the mirror 22 at an angle of 45 degrees is not at a proper height for convenient viewing. In this case, the mirror 22 is rotated upwardly or downwardly relative to the projection head 16 so that the image is reflected to the image plane at a higher or lower level, respectively. Such movement of the planar mirror 22 causes two problems. First, the overall focus of the image is lost because the distance from the projection lens 20 to the image is increased, without a proportional decrease in the distance from the object plane 18 to the projection lens 20. This problem can be overcome, and the image brought into general overall focus by rotating the knob 24 and thus decreasing the distance from the projection lens 20 to the object plane 18.

The second problem caused by decreasing the angle of the mirror 22 is that the image will not be uniformly in focus, even though the overall focus has been corrected by adjusting the height of the projection lens 20. This lack of uniform focus throughout the image will be referred to as Scheimpflug distortion and is caused because the extended planes of the reflected image, the object plane 18 and the projection lens 20 do not meet at a point or infinity.

This Scheimpflug distortion may be corrected in one of two ways. Either the screen defining the image plane may be tilted or the projection lens 20 may be tilted so that its extended plane coincides with the intersection of the extended planes of the object and the reflected image. The Scheimpflug condition will be met if the projection lens 20 is rotated in the same direction as the mirror 22, but to a lesser degree of rotation than the mirror 22. This solution to Scheimpflug distortion is usually more feasible than providing a tilting projection screen since such a screen represents additional expense, is not easily portable and may not be available. Thus where a vertical imaging surface is employed, and it is desirable to raise or lower the projected image by rotating the mirror 22, two adjustments must be made to retain overall focus and prevent Scheimpflug distortion. Both these adjustments involve the projection lens 20. The projection lens 20 must be rotated relative to the object plane 18 to correct for Scheimpflug distortion and the projection lens 20 must be translated relative to the object plane 18 to correct the overall focus of the image.

Figure 2:
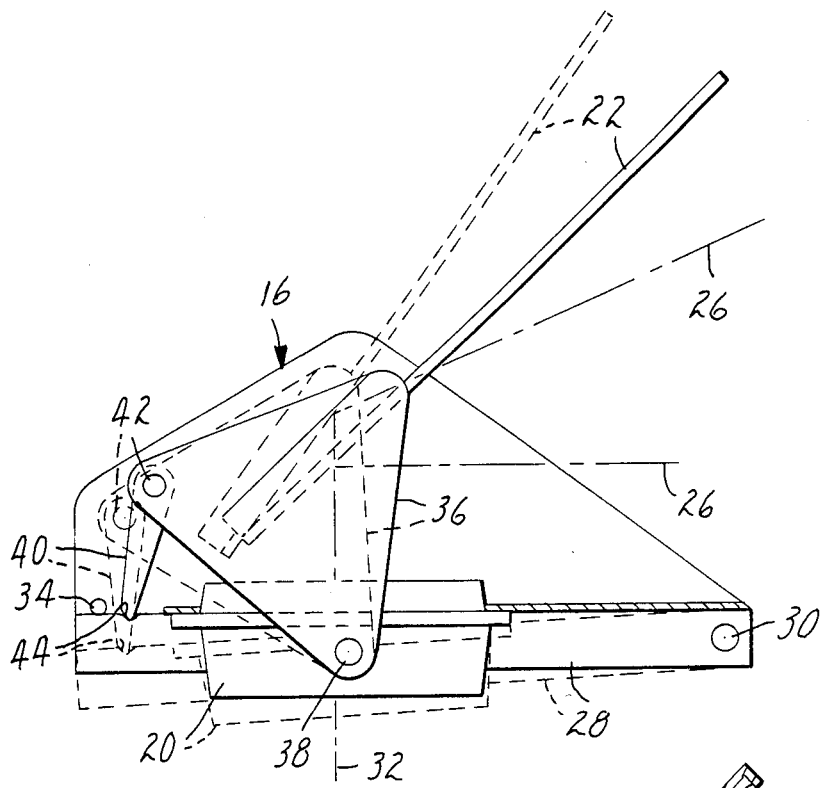
FIG. 2 is a cross-sectional view of the projection head of FIG. 1 taken generally along the line 2—2 of FIG. 1.

These rotational and translational corrections of the projection lens 20 in response to rotation of the mirror 22 are accomplished according to the present invention as illustrated in FIG. 2. Solid lines represents the position of the mirror 22 and the projection lens 20 when the mirror is oriented at an angle of 45 degrees to the object plane 18 and phantom lines illustrates the positions of the mirror 22 and the projection lens 20 when the mirror 22 is rotated to achieve a higher image position, exemplified in FIG. 2 by an upward angular increase in the optic axis 26 of the image of 23 degrees. While the invention and the following discussion also apply to the situation where the mirror is rotated to lower the position of the image, it is more usual to require that the image be raised. For ease and clarity of explanation, only this situation is illustrated and discussed.

According to the present invention, the projection lens 20 is supported by a frame 28 which is attached to the forward end of the projection head 16 by a pivot 30 which may be a pin connecting the projection head 16 and the frame 28. The pivot 30 is forward of, and removed from, the optic axis 32 of the projection lens 20 so that rotation of the frame 28 around the pivot 30 results in translation of the projection lens 20 relative to the object plane 18 as well as rotation of the projection lens 20 relative to the object plane 18. Movement of the frame 28 is arrested, in an upward direction, at a horizontal position parallel to the object plane 18 by a pin 34 and the frame 28 is biased toward the pin 34 by a spring (not shown) which may conveniently be an extension spring connecting the pin 34 and the frame 28 or a torsion spring wrapped around the pivot 30 and connecting the projection head 16 and the frame 28.

The mirror 22 is connected to the projection head 16 by side plates 36 which are journaled on pins 38 extending a short distance inwardly from the projection head 16. Thus the projection lens 20 and the planar mirror 22 may rotate relative to the projection head 16 independently of each other with respect to their pins 30 and 38, respectively.

The mirror 22 and the projection lens 20 are interconnected by a link 40 which is rotatably connected to one of the side plates 36 by a pin 42 and which engages a notch 44 formed in the projection lens frame 28.

When the link 40 is positioned to engage the notch 44, as shown in FIG. 2, rotation of the mirror 22, in a counterclockwise direction, will cause the link 40 to force the projection lens frame 28 in a downward direction, from the position shown in solid lines to the position shown in phantom lines. Friction between the side plates 36 and the projection head 16 or between the side plates 36 and their pivot pins 38, must be sufficient to counteract the spring biasing the frame 28 so that the mirror 22 and the projection lens 20 remain in their rotated positions.

Rotation of the mirror 22 thus results in rotation of the projection lens 20 around its pivot 30 and also translation of the projection lens 20 in a downward direction toward the object plane 18. Rotation of the projection lens 20 corrects for Scheimpflug distortion and translation of the projection lens 20 corrects the overall focus of the projected image. Thus no adjustments to the projection head 16 are necessary to fully correct the projected image when the mirror 22 is rotated to position the projected image at a higher position.

It was mentioned earlier that one possible way to correct for Scheimpflug distortion is to provide a tilting screen so that the image is projected onto a tilted rather than vertical surface. If such a screen is available, it will be unnecessary to tilt the projection lens 20 in response to rotation of the mirror 22, because Scheimpflug distortion can be corrected for by tilting the screen. In this instance, it is desirable that the mirror 22 be free to rotated without affecting the position of the projection lens 20. This free rotation of the mirror 22 is accomplished by rotating the link 40 out of contact with the projection lens frame 28 so that the mirror side plates 36 and the frame 28 are no longer connected. Rotation of the mirror 22 will not effect translation or rotation of the projection lens 20. It will be recognized in this instance, however, that rotation of the mirror 22 may change the length of the optic path 26 from the projection lens 20 to the tilted projection screen and the image may lose overall focus. Thus translation of the projection lens 20 relative to the object plane 18 will be required to correct the overall focus of the image, even though no correction for Scheimpflug distortion is necessary. Such translation of the projection lens 20 without rotation may be accomplished, as described earlier, by rotating the adjusting knob 24 and thus moving the entire projection head 16 relative to the object plane 18, as is conventional.

The relative amount of rotation of the projection lens 20 relative to its translation and the amount of each of these variables required for a given rotation of the mirror 22 may be calculated as is well known to those skilled in the art, and is determined by the horizontal distance between the pivot points 38 and 42, and the distance between the optic axis 32 of the projection lens 20 and its pivot 30. These variables may be changed depending upon the magnification of the projector 10 because a low magnification system requires greater translation and rotation of the projection lens 20 for each degree of rotation of the mirror 22 than does a high magnification system.

The following table illustrates how these relative values change for different magnifications by listing the tilt of the projection lens 20 in degrees required per degree of mirror 22 tilt (A) and the displacement of the projection lens 20 in millimeters required per degree of mirror 22 tilt (B) for various magnifications:

| Magnification | A | B |
| --- | --- | --- |
| 3.00 × | 0.49 | 0.96 |
| 4.12 × | 0.38 | 0.65 |
| 5.33 × | 0.32 | 0.39 |
| 12.20 × | 0.16 | 0.19 |

Although the table covers a wide range of magnifications, most projectors are utilized in the range of magnification between 5× and 6×. A projection head 16 designed for this range would, therefore, accommodate most situations and would provide some help where magnifications outside the range were used.

Figure 3:
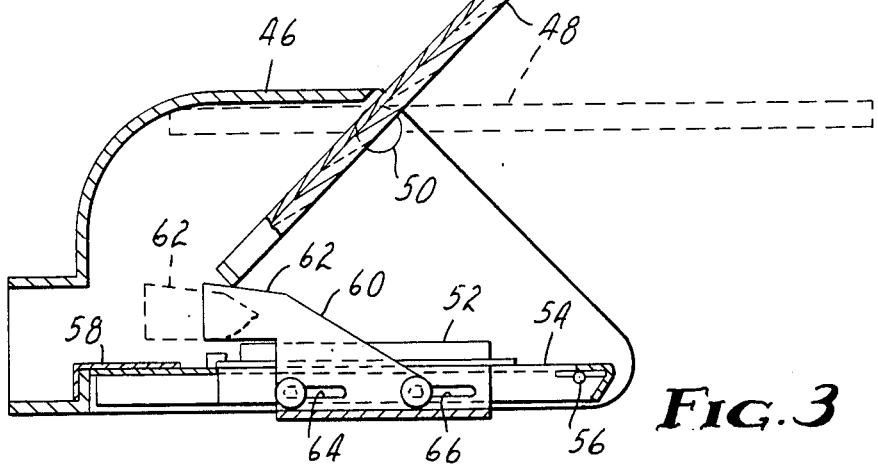
FIG. 3 is a cross-sectional view of an alternate embodiment of a projection head according to the present invention, also from the perspective of line 2—2 of FIG. 1.

FIG. 3 illustrates a second embodiment of a projection head 46 which operates identically to the projection head 16 illustrated in FIGS. 1 and 2, but which exemplifies the modifications which may be made in its design. The projection head 46 includes a mirror 48 which is pivoted to the projection head 46 by means of a pin 50. A projection lens 52 is mounted in a frame 54 which is pivoted to the projection head 46 by a pin 56. The frame 54 is prevented from rotating upwardly beyond the horizontal by a stop 58 molded into the projection head 46.

Attached to the projection lens frame 54 is a sliding cam 60 which includes an inclined surface 62 for contact with the mirror 48. The cam 60 may slide by means of slots 64 and 66 to the position illustrated by phantom lines if it is desired that the mirror 48 rotate independently of the projection lens 52.

Rotation of the mirror 48 causes contact between the mirror 48 and the inclined surface 62 of the cam 60 and forces the projection lens 52 and its frame 54 to rotate about the mounting pin 56. Thus rotation of the mirror 48 causes rotation and translation of the projection lens 52 as described above.

Although the present invention has been described with reference to only two embodiments, it is apparent that many modifications, particularly in the linkage connecting the mirror 22 or 48 and the projection lens 20 or 52, will be apparent to those skilled in the art. All such modifications falling within the spirit and scope of the appended claims are intended to be included within the invention.

I claim:

1. In an overhead projector including an object plane, a projection lens disposed above the object plane and a planar mirror disposed above the projection lens and along a common optic axis, the improvement comprising:
    a projection head pivotally mounting said mirror for rotation with respect to said object plane;
    a frame mounting said projection lens and connected at a pivot to said projection head, said pivot being removed from said optic axis so that rotation of said frame about said pivot results in rotation and translation of said projection lens; and
    linkage means for connecting said mirror and said projection lens frame so that pivoting of said mirror produces rotation of said frame about said pivot and said rotation and translation of said projection lens with respect to said optic axis.

2. An improved overhead projector according to claim 1 wherein said linkage means is selectively removable so that said mirror may be disconnected from said frame and pivoted without affecting the position of said frame or said projection lens.

* * * * *